United States Patent
Ishiguro

(10) Patent No.: US 10,126,956 B2
(45) Date of Patent: Nov. 13, 2018

(54) INFORMATION PROCESSING DEVICE AND INFORMATION PROCESSING METHOD

(71) Applicant: MITSUBISHI ELECTRIC CORPORATION, Tokyo (JP)

(72) Inventor: Takehiro Ishiguro, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/565,883

(22) PCT Filed: Jun. 16, 2015

(86) PCT No.: PCT/JP2015/067285
§ 371 (c)(1),
(2) Date: Oct. 11, 2017

(87) PCT Pub. No.: WO2016/203541
PCT Pub. Date: Dec. 22, 2016

(65) Prior Publication Data
US 2018/0113630 A1  Apr. 26, 2018

(51) Int. Cl.
*G06F 3/06* (2006.01)
*G06F 11/34* (2006.01)
*H04L 12/26* (2006.01)

(52) U.S. Cl.
CPC ............ *G06F 3/0613* (2013.01); *G06F 3/067* (2013.01); *G06F 3/0656* (2013.01); *G06F 11/34* (2013.01); *H04L 43/0882* (2013.01)

(58) Field of Classification Search
CPC .... G06F 3/0613; G06F 3/0619; G06F 3/0653; G06F 3/0656; G06F 3/0658; G06F 3/067;
(Continued)

(56) References Cited

U.S. PATENT DOCUMENTS 6,330,603 B1    12/2001  Seki et al.
8,369,324 B1 *   2/2013  Breight .................. H04L 47/38
                                                       370/389

(Continued)

FOREIGN PATENT DOCUMENTS

JP           2-43636 A    2/1990
JP          10-243018 A   9/1998
(Continued)

*Primary Examiner* — Gary J Portka

(74) *Attorney, Agent, or Firm* — Birch, Stewart, Kolasch & Birch, LLP

(57) ABSTRACT

In the present invention, an information amount of information to be collected is reduced gradually based on a collection speed, a transmission speed, and information amount reduction levels each being gradual setting of processing details of reducing an information amount for each piece of the information to be collected. Hence, when collecting energy information and working information from apparatuses installed in, for example, factories, houses, buildings, and so on, if the apparatuses switch between working and stopping frequently and a situation where the information cannot be collected duly occurs, missing of information to be collected, particularly high-priority information, can be minimized in comparison with cases where the amount of information to be collected is adjusted in accordance with the priority or by a thinning-out process.

5 Claims, 11 Drawing Sheets

(58) Field of Classification Search
CPC ........... G06F 3/0683; G06F 2003/0691; H04L 43/0882
USPC ............... 710/52, 60; 711/154, 167, 171
See application file for complete search history.

(56) References Cited

U.S. PATENT DOCUMENTS

| | | | |
|---|---|---|---|
| 8,918,563 B2* | 12/2014 | Ehsan | .................. H04L 47/263 370/232 |
| 2002/0029262 A1 | 3/2002 | Matsumura et al. | |
| 2003/0200310 A1 | 10/2003 | Matsumura et al. | |
| 2007/0038738 A1 | 2/2007 | Iyengar | |
| 2008/0276244 A1 | 11/2008 | Iyengar | |
| 2009/0028050 A1* | 1/2009 | Winter | ................ H04L 43/0882 370/236 |
| 2012/0203746 A1 | 8/2012 | Iyengar | |
| 2012/0209994 A1 | 8/2012 | Iyengar | |
| 2014/0355032 A1 | 12/2014 | Ito | |

FOREIGN PATENT DOCUMENTS

| | | |
|---|---|---|
| JP | 11-143829 A | 5/1999 |
| JP | 2000-259520 A | 9/2000 |
| JP | 2002-366393 A | 12/2002 |
| JP | 2003-132019 A | 5/2003 |
| JP | 2008-108154 A | 5/2008 |
| JP | 2009-503686 A | 1/2009 |
| JP | 2011-258064 A | 12/2011 |
| JP | 2012-175376 A | 9/2012 |
| JP | 2014-232353 A | 12/2014 |

\* cited by examiner

Fig. 3

| APPARATUS ADDRESS | INFORMATION ADDRESS | INFORMATION SIZE | COLLECTION CYCLE | INFORMATION AMOUNT REDUCTION LEVELS | | | |
|---|---|---|---|---|---|---|---|
| | | | | LEVEL 0 | LEVEL 1 | LEVEL 2 | ... |
| 192.168.0.1 | 10A0 | 4 | 10ms | | | | |
| 192.168.0.1 | 10A4 | 4 | 10ms | | | MOVING AVERAGE (50ms) | |
| 192.168.0.1 | 10A8 | 4 | 20ms | | MOVING AVERAGE (60ms) | MOVING AVERAGE (60ms) | |
| 192.168.0.2 | 1F22 | 2 | 5ms | | THIN OUT | THIN OUT | |
| 192.168.0.2 | 1F24 | 2 | 5ms | | | CUMULATE | |
| ... | | | | | | | |
| REQUIRED COLLECTION SPEED | | | | 4MB/s | 2MB/s | 500KB/s | |

Fig. 4

| ADDING APPARATUS INFORMATION | | |
|---|---|---|
| 91 | APPARATUS ADDRESS | 192.168.0.3 | |
| 92 | INFORMATION ADDRESS | 0x5B9C | |
| 93 | INFORMATION SIZE | 16bit | |
| 94 | COLLECTION CYCLE | 25ms | |
| 95 | INFORMATION AMOUNT REDUCTION LEVELS | LEVEL 1 | MOVING AVERAGE (50ms) |
| | | LEVEL 2 | THIN OUT |
| | | ... | ... |

Fig. 9

| APPARATUS ADDRESS (91) | INFORMATION ADDRESS (92) | INFORMATION SIZE (93) | PROCESSING CLASSIFI-CATION (97) | REDUCTION START LEVEL (98) | COLLECTION CYCLE (94) | INFORMATION AMOUNT REDUCTION LEVELS (95) / LEVEL 0 | LEVEL 1 | LEVEL 2 | ... |
|---|---|---|---|---|---|---|---|---|---|
| 192.168.0.1 | 10A0 | 4 | | | 10ms | NO PROCESSING | AVERAGING: MOVING AVERAGE | AVERAGING: MOVING AVERAGE | |
| 192.168.0.1 | 10A4 | 4 | AVERAGING | 2 | 10ms | | THINNING OUT: THIN OUT | THINNING OUT: THIN OUT | |
| 192.168.0.1 | 10A8 | 4 | AVERAGING | | 20ms | | CUMULATING: NO PROCESSING | CUMULATING: CUMULATE | |
| 192.168.0.2 | 1F22 | 2 | THINNING OUT | | 5ms | | | | |
| 192.168.0.2 | 1F24 | 2 | CUMULATING | | 5ms | | | | |
| ... | | | | | | | | | |
| REQUIRED COLLECTION SPEED (96) | | | | | | 4MB/s | 2MB/s | 500KB/s | |

SETTING OF INFORMATION AMOUNT REDUCTION LEVEL

| LEVELS | PROCESSING CLASSIFICATIONS 97 | PROCESSING DETAILS 99 |
|---|---|---|
| LEVEL 1 | AVERAGING | MOVING AVERAGE (50ms) |
| | THINNING OUT | THIN OUT EVERY 4TH PIECE |
| | CUMULATING | NO PROCESSING |
| | ... | ... |
| LEVEL 2 | AVERAGING | MOVING AVERAGE (60ms) |
| | THINNING OUT | THIN OUT EVERY 2ND PIECE |
| | CUMULATING | CALCULATE CUMULATIVE VALUE |
| | ... | ... |
| ... | ... | ... |

Fig. 11

| ADDING APPARATUS INFORMATION | |
|---|---|
| 91 APPARATUS ADDRESS | 192.168.0.3 |
| 92 INFORMATION ADDRESS | 0x5B9C |
| 93 INFORMATION SIZE | 16bit |
| 94 COLLECTION CYCLE | 25ms |
| 97 PROCESSING CLASSIFICATION | AVERAGING |
| 98 REDUCTION START LEVEL | 1 |

INFORMATION PROCESSING DEVICE AND INFORMATION PROCESSING METHOD

TECHNICAL FIELD

The present invention relates to an information processing device and an information processing method which collect information from a plurality of apparatuses.

BACKGROUND ART

When collecting information from a plurality of apparatuses by utilizing the Internet, an available communication band fluctuates largely when compared to a case where a dedicated line is utilized. If the communication environment deteriorates, the collected information cannot possibly be transmitted in time.

Under these circumstances, Patent Literature 1 discloses a method in which an administrative manager who supervises possible troubles of a plurality of computers collects logs from the computers. According to this prior art, the administrative manager sends the level of the logs to be collected to the computers in the same network, and the computers collect logs which are of the same level as or of a higher level than the level sent to the computers and send the collected logs to the administrative manager. In this case, the level of the logs is determined by the congestion degree of the network so that the amount of logs to be collected is adjusted.

Patent Literature 2 discloses a method in which a data collecting/recording device collects and accumulates data indicating the status of a management target system. According to this prior art, when the remaining recording capacity of the data collecting/recording device becomes equal to or lower than a predetermined criterion, the significance of data received from the management target system is determined, and the thinning-out interval is changed depending on the significance, thereby adjusting the amount of information to be collected.

Patent Literature 1: JP 2003-132019 A
Patent Literature 2: JP 2011-258064 A

SUMMARY OF INVENTION

Technical Problem

In the system and method indicated in Patent Literatures 1 and 2, the information amount is reduced by thinning out information to be collected depending on the congestion degree of the network and the significance of collected information. Therefore, if the status of information collection fluctuates sharply and greatly and a situation where the information cannot be collected duly occurs, the amount of information to be collected is adjusted by thinning out the information depending on the congestion degree of the network, and the significance of the collected information. This may lead to a problem that significant information is missed in a particular situation.

Solution to Problem

An information processing device according to the present invention includes: a collection unit to collect information from an apparatus; a buffer to temporarily accumulate the information collected by the collection unit; a transmission unit to send the information accumulated in the buffer to a storage device; and a collection control unit to control the collection unit so as to reduce gradually an information amount of information to be collected based on a collection speed at which the collection unit collects the information from the apparatus, a transmission speed at which the transmission unit transmits the information to the storage device, and information amount reduction levels each being gradual setting of processing details of reducing an information amount for each piece of the information to be collected.

Advantageous Effects of Invention

According to the present invention, the information amount of the information to be collected is reduced gradually based on a collection speed, a transmission speed, and information amount reduction levels each being gradual setting of the processing details of reducing the information amount for each piece of the information to be collected. Hence, if the status of information collection fluctuates sharply and greatly and a situation where the information cannot be collected duly occurs, missing of information to be collected, particularly high-priority information, can be minimized in comparison with cases where the information amount is adjusted by a process of thinning out the information depending on the congestion degree of the network and the significance of the collected information.

BRIEF DESCRIPTION OF DRAWINGS

FIG. 3 illustrates examples of collecting information in Embodiment 1 of the present invention.

FIG. 4 illustrates an example of a screen for adding apparatus information in Embodiment 1 of the present invention.

FIG. 9 illustrates examples of collecting information 90 in Embodiment 2 of the present invention.

FIG. 10 illustrates an example of a screen for setting information amount reduction levels in Embodiment 2 of the present invention.

FIG. 11 illustrates an example of a screen for adding apparatus information in Embodiment 2 of the present invention.

DESCRIPTION OF EMBODIMENTS

Embodiments of an information processing device according to the present invention will be described in detail hereinafter with referring to accompanying drawings. Note that the present invention will not be limited by these embodiments.

Embodiment 1

Figure 1:
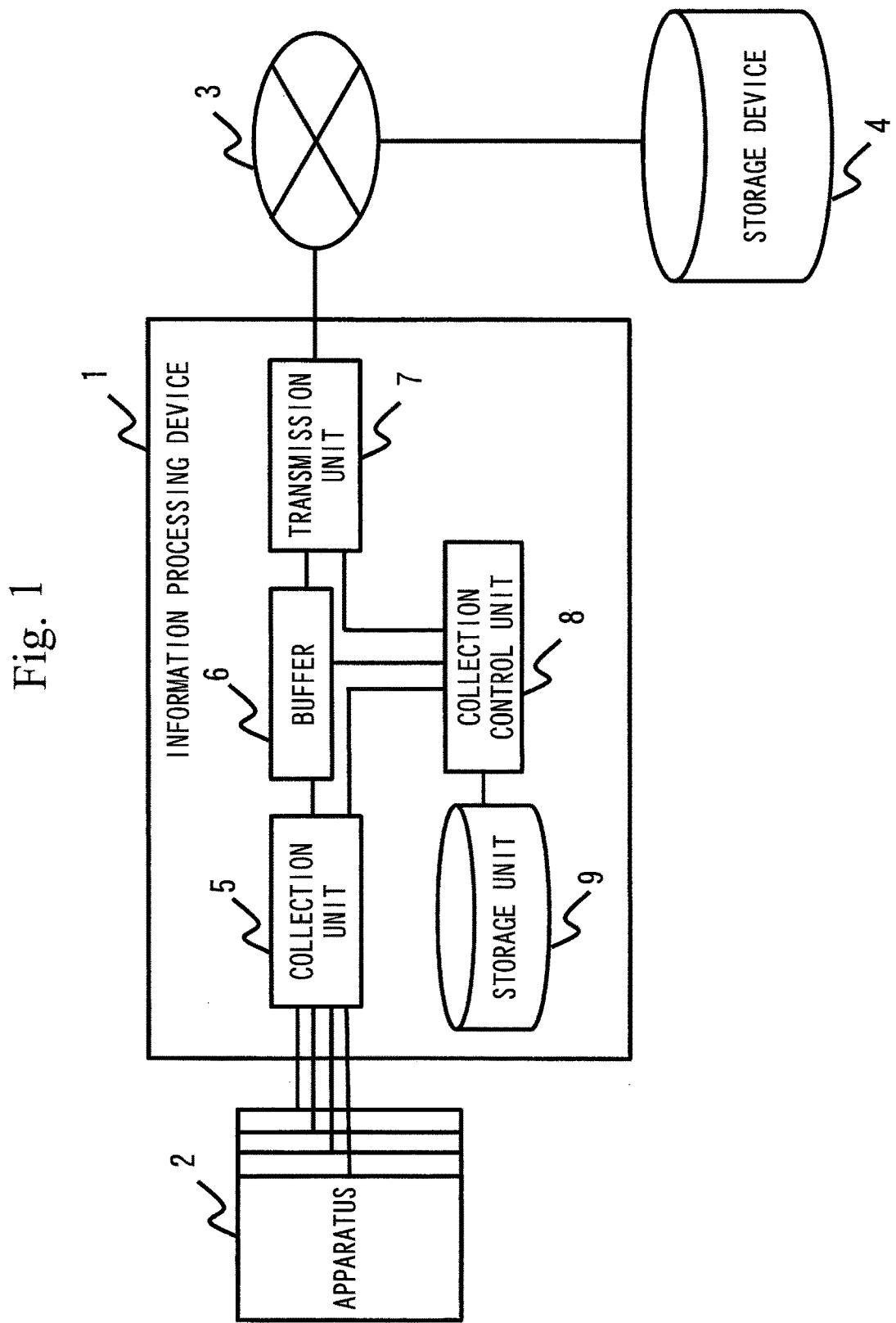
FIG. 1 is a configuration diagram of an information processing device 1 in Embodiment 1 of the present invention.

FIG. 1 is a configuration diagram of an information processing device 1 in Embodiment 1 of the present invention.

Referring to FIG. 1, the information processing device 1 is connected to one or a plurality of apparatuses 2. The information processing device 1 collects information from a connected apparatus 2 and transmits the information collected from the apparatus 2 to an external storage device 4 connected to the information processing device 1 via a communication network 3, so as to store the collected information to the storage device 4.

The information processing device 1 includes a collection unit 5, a buffer 6, a transmission unit 7, a collection control unit 8, and a storage unit 9.

The collection unit 5 is connected to an apparatus 2. Upon reception of collection request information from the collection control unit 8, the collection unit 5 collects information held by the connected apparatus 2 from the apparatus 2 in accordance with the contents of the collection request information. The collection unit 5 outputs the collected information to the buffer 6 so as to store the information in the buffer 6 temporarily. When the collection unit 5 is to output the collected information to the buffer 6, if the collection unit 5 receives from the collection control unit 8 collection request information including processing details for reducing the information amount of the information to be collected, the collection unit 5 processes the collected information according to the processing details so as to adjust the information amount, and outputs the information to the buffer 6. When the process of collecting the information and storing the collected information in the buffer temporarily is completed, the collection unit 5 outputs a completion message to the collection control unit 8. This process of the collection unit 5 is entirely executed in the background independently of the transmission unit 7 and the collection control unit 8, and accordingly does not affect the processes of the transmission unit 7 and collection control unit 8.

The buffer 6 receives from the collection unit 5 the information collected from the apparatus 2, and stores the received information temporarily. The information temporarily stored in the buffer 6 is transmitted to the external storage device 4 by the transmission unit 7. The buffer 6 has a role of adjusting temporary imbalance between the collection speed at which the collection unit 5 collects information from the apparatus 2 and the transmission speed at which the transmission unit 7 sends the information to the storage device 4. Upon reception of a storing situation request that requests the storing situation of the information from the collection control unit 8, the buffer 6 outputs an information capacity (free space) where information can be additionally accumulated at present to the collection control unit 8.

The transmission unit 7 sends the information temporarily stored in the buffer 6 to the external storage device 4 via the communication network 3 so as to store the information in the storage device 4. During that time, upon reception of sending request information from the collection control unit 8, the transmission unit 7 acquires from the buffer 6 the information temporarily stored in the buffer 6 in accordance with the sending request information. Then, the transmission unit 7 sends the acquired information to the storage device 4 via the communication network 3 with using a Structured Query Language (SQL) sentence or the like, so as to store the acquired information in the storage device 4. Also, when the process of sending and storing the information to the storage device 4 is completed, the transmission unit 7 outputs a completion message to the collection control unit 8. The above process of the transmission unit 7 is entirely executed in the background independently of the collection unit 5 and the collection control unit 8 and accordingly does not influence the processes of the collection unit 5 and collection control unit 8.

The collection control unit 8 outputs the storing situation request to the buffer 6. Based on free space information acquired from the buffer 6, if the buffer 6 has a free space needed to save information to be collected next, the collection control unit 8 outputs collection request information concerning the information to be collected next to the collection unit 5. In this case, the collection control unit 8 refers to collecting information 90 stored in the storage unit 9 to determine the order of the information to be collected. The collection control unit 8 determines one of information amount reduction levels which indicate gradually the processing details of reducing the information amount of the information to be collected. The collection control unit 8 then determines the processing details corresponding to the determined information amount reduction level for each piece of information to be collected. Then, the collection control unit 8 outputs to the collection unit 5 the collection request information including the apparatus 2 whose information is to be collected, the information to be collected, the size of the information to be collected, and the processing details of the information to be collected. The collection control unit 8 manages the collection unit 5 through the collection request information and the completion message. The process of the collection control unit 8 is executed in asynchronism with the collection unit 5.

The collection control unit 8 also outputs the storing situation request to the buffer 6 to acquire the situation where the information is stored. If the situation is that the information is stored in the buffer 6 and the completion message has been received from the transmission unit 7, the collection control unit 8 outputs sending request information for sending the next information to the storage device 4, to the transmission unit 7. The collection control unit 8 manages the transmission unit 7 through the sending request information and the completion message. The process of the collection control unit 8 is executed in asynchronism with the transmission unit 7.

Also, the collection control unit 8 calculates a required collection speed of each information amount reduction level. The required collection speed is a collection speed required for collecting all pieces of information with the collection cycle being set for each piece of information and according to the processing details being set in the information amount reduction levels. The collection control unit 8 determines one of the information amount reduction levels with using the collection speed at which the collection unit 5 collects the information from the apparatus 2, the transmission speed at which the transmission unit 7 sends the information to the storage device 4, and the required collection speed. The collection control unit 8 switches between the information amount reduction levels depending on the determination result. The collection control unit 8 outputs the collection request information including the processing details corresponding to the switched information amount reduction level, to the collection unit 5.

The storage unit 9 is provided inside or outside of the information processing device 1 and stores collecting information according to which the collection unit 5 collects information from the apparatus 2. The collecting information includes an apparatus address, information address, collection cycle, processing details of each information amount reduction level, and required collection speed of each information amount reduction level. When either one of the collection cycle of the apparatus whose information is to be collected and the processing details of each information amount reduction level is updated, the collection control unit 8 calculates the required collection speed again. The required collection speed is updated by the calculated required collection speed. Detailed information explanation of the collecting information will be given later.

Figure 2:
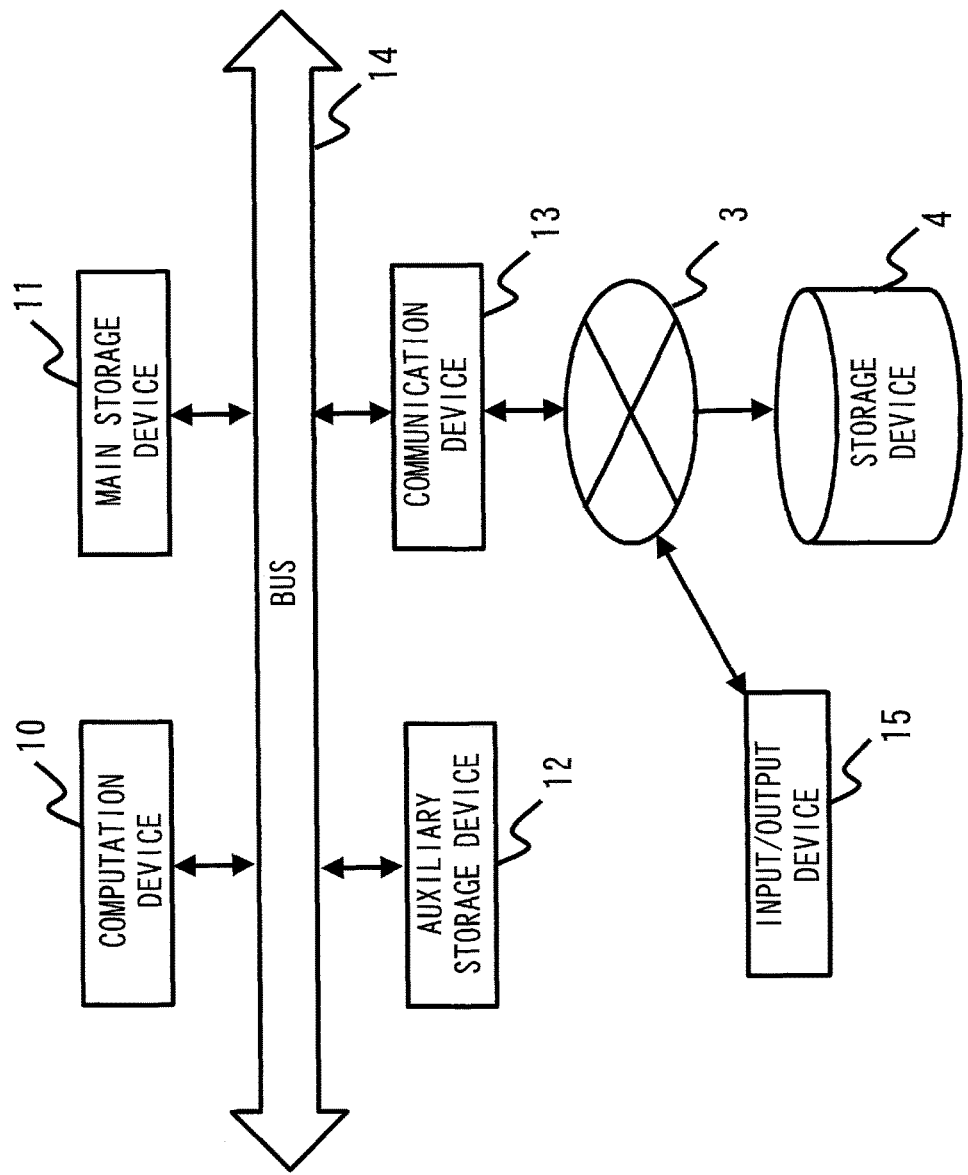
FIG. 2 is a hardware configuration diagram of the information processing device 1 in Embodiment 1 of the present invention.

FIG. 2 is a hardware configuration diagram of the information processing device 1 in Embodiment 1 of the present invention.

The information processing device 1 is comprised of a computation device 10, a main storage device 11, an auxiliary storage device 12, and a communication device 13. The computation device 10, the main storage device 11, the auxiliary storage device 12, and the communication device 13 are connected to each other via a bus 14 and connected to the external storage device 4 and an external input/output device 15 by the communication device 13 via the communication network 3. The input/output device 15 may be connected via the bus 14.

The computation device 10 is, for example, a Central Processing Unit (CPU) or a Digital Signal Processor (DSP).

The auxiliary storage device 12 is, for example, a Read Only Memory (ROM), a flash memory, or a Hard Disk Drive (HDD).

The main storage device 11 is, for example, a Random Access Memory (RAM).

The communication device 13 includes, for example, a receiver for receiving data and a transmitter for sending data. The communication device 13 is, for example, a communication chip or a Network Interface Card (NIC).

The input/output device 15 is, for example, a mouse, a keyboard, a display, or a touch panel; or a computer provided with a mouse, a keyboard, a display, or a touch panel.

The processes of the collection unit 5 and transmission unit 7 are executed by the computation device 10. The transmission unit 7 communicates with the external storage device by the communication device 13 via the communication network 3 to send the information to the external storage device. The buffer 6 for temporarily storing the information collected by the collection unit 5 is implemented by either one or both of the main storage device 11 and the auxiliary storage device 12. The process of the collection control unit 8 is executed by the computation device 10. Interim information and so on of calculation done by the collection control unit 8 are stored in the main storage device 11. The collecting information 90 to be stored in the storage unit 9 has been set by a user with using the external input/output device 15 via the communication network 3 and stored in the auxiliary storage device 12.

The collecting information will be described with referring to examples.

FIG. 3 illustrates examples of the collecting information in Embodiment 1 of the present invention.

The collecting information 90 includes information of an apparatus address 91, information address 92 and information size 93 in the apparatus, collection cycle 94 at which the information is collected, information amount reduction levels 95 each being setting of the processing details of reducing gradually the information amount of the information to be collected, and required collection speed 96 of each information amount reduction level 95. The user sets the apparatus address 91, the information address 92, the information size 93, the collection cycle 94, and the information amount reduction levels 95 in accordance with a method to be described later.

The apparatus address 91 is an address value of the collection target apparatus 2 whose information is to be collected.

The information address 92 is an address value at which the information to be collected is stored in the apparatus 2.

The information size 93 represents a range where the information to be collected is stored in the apparatus 2.

The collection cycle 94 is an interval at which the information is collected from the collection target apparatus 2. For each piece of information, a corresponding collection cycle 94 is related to the information and stored.

The information amount reduction levels 95 are each gradual setting of the processing details, for a corresponding piece of information to be collected, of reducing the information amount. The user who collects the information sets the information amount reduction levels 95. The processing details are set such that the higher the information amount reduction level 95 thereof, the larger the amount of the collected information to be reduced. For information of higher priority, however, its processing details are set such that the reduction amount is relatively smaller than the reduction amount for information of lower priority. For information to be collected with the highest priority, its processing details are not set in its information amount reduction level 95. Where the processing details are not set in an information amount reduction level 95, information is collected without undergoing the process of reducing the information amount. This can prevent ending up not acquiring significant information.

The number of levels and processing details of the information amount reduction levels 95 shall be set freely by the user within a range where the information processing device 1 is capable of processing. For example, "thin out", "moving average", "cumulate", and so on are set as the processing details. Where the processing details "thin out" are set, an interval is also set arbitrarily. Where the processing details "moving average" are set, a section as to from how past values a moving average is to be calculated is also set. Where the processing details "cumulate" are set, a section to be cumulated is also set.

The required collection speed 96 is a collection speed required for collecting all pieces of information with the preset collection cycle and according to the processing details set in each information amount reduction level at each information amount reduction level (including level 0 being a state where reduction is not carried out). The required collection speed 96 is calculated by the collection control unit 8 from the information sizes, collection cycles, and information amount reduction levels of all pieces of information to be collected, and is stored in the storage unit 9 as the collecting information 90.

How the user sets the collecting information 90 will be described now.

FIG. 4 illustrates an example of a screen for adding apparatus information in Embodiment 1 of the present invention.

The user enters the collecting information 90 with using, for example, a screen as illustrated in FIG. 4 for adding apparatus information. The items to be entered by the user are the apparatus address 91, the information address 92, the information size 93, the collection cycle 94, and the information amount reduction levels 95. The processing details of each level are entered in the information amount reduction levels 95. The user enters the five items from the screen as illustrated in FIG. 4 by the external input/output device 15 via the communication network 3 of the information processing device 1 so as to set the collecting information 90 for each apparatus whose information is to be collected. Alternatively, the user may set the five items by entering them using a display function and input function provided to the information processing device 1. Alternatively, the user may enter the five items from the screen as illustrated in FIG. 4 by the external input/output device 15 and may input the entered information to the information processing device 1 in the form of a data file via the communication network 3.

The operation of the collection control unit 8 of the information processing device 1 will now be described.

Figure 5:
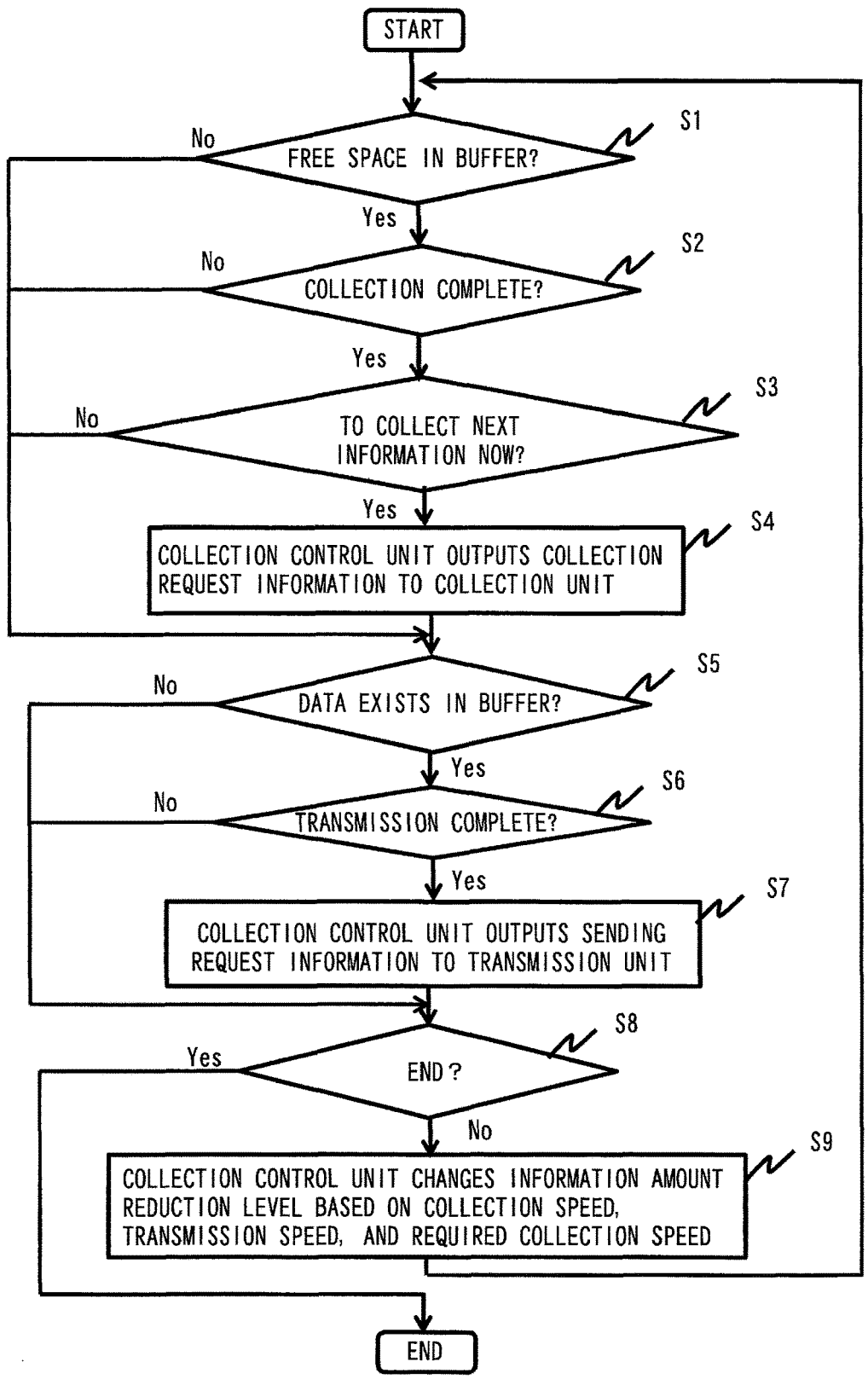
FIG. 5 is a flowchart illustrating an operation of a collection control unit 8 in Embodiment 1 of the present invention.

FIG. 5 is a flowchart illustrating the operation of the collection control unit 8 in Embodiment 1 of the present invention.

First, prior to collecting the information, the user sets the collecting information 90 to be stored in the storage unit 9 of the information processing device 1.

Assume that at the start of information collection, 0 (zero) out of the information amount reduction levels 95 has been set. Namely, at the start of information collection, the amount of information to be collected will not be reduced according to the processing details, so the collection control unit 8 does not output the processing detains to the collection unit 5. More specifically, assume that there is a free space available in the buffer 6 to accommodate information to be collected next (S1), that a completion message of information collection of the last time has been inputted from the collection unit 5 (S2), and that the next information is to be collected now (S3). In this case, the collection control unit 8 outputs the collection request information including one data piece of an apparatus address, one data piece of an information address, and one data piece of an information size 93, all of which are stored as the collecting information 90, to the collection unit (S4). If there is no free space available in the buffer 6 (No in S1), or if information collection of the last time has not been completed (No in S2), or if the next information is not to be collected now (No in S3), the collection control unit 8 does not send the collection request information to the collection unit 5, and proceeds to the next process (S5).

Then, if collected information exists in the buffer 6 (S5) and a completion message of the last time indicating completion of transmission to the external storage device has been received from the transmission unit 7 (S6), the collection control unit 8 outputs the sending request information to the transmission unit 7 (S7). If collected information does not exist in the buffer 6 (No in S5) or transmission by the transmission unit 7 is not completed (No in S6), the collection control unit 8 does not send sending request information to the transmission unit 7 and proceeds to the next process (S8).

Then, the collection control unit 8 checks if the user has entered an end of the information collection process (S8). When an end is entered by the user, the collection control unit 8 ends the process.

If an end of the process has not been entered by the user, the collection unit 5 determines one of the information amount reduction levels based on the collection speed at which the collection unit 5 collects information from the apparatus 2, the transmission speed at which the transmission unit 7 sends information to the storage device 4, and the required collection speed 96, and switches the currently set level to the determined information amount reduction level 95 (S9). The collection control unit 8 renders the collection request information to include the processing details corresponding to the switched information amount reduction level, and returns to the process of S2 to output the collection request information to the collection unit.

So far the operation of the collection control unit 8 has been described.

With regard to the process of S4, for example, a case where level 0 (zero) out of the information amount reduction levels 95 is set will be described.

Assume that the collection control unit 8 has referred to the collecting information 90 of the storage unit 9 and acquired, for example, data (the third data in FIG. 3) of the apparatus address 91 "192.168.0.1" and information address 92 "10A8" of the collecting information 90 of FIG. 3, as information to be collected. Also assume that the collection control unit 8 controls the collection unit 5, by outputting collection request information to the collection unit 5, to collect information of the apparatus address 91 "192.168.0.1" and the information address 92 "10A8".

During that time, the collection control unit 8 refers to the collecting information 90 of the storage unit 9 and acquires the processing details whose information amount reduction level 95 corresponding to the apparatus address 91 "192.168.0.1" and the information address 92 "10A8" is 0 (zero). When the information amount reduction level 95 is 0, no processing details are set. Hence, the collection control unit 8 outputs to the collection unit 5 collection request information having no processing details. That is, the collection control unit 8 outputs the collection request information including the apparatus address 91 "192.168.0.1", the information address 92 "10A8", and the information size 93 "4" to the collection unit 5.

With regard to the process of S4, for example, a case where level 1 out of the information amount reduction levels 95 is set will be described.

Assume that the collection control unit 8 controls the collection unit 5, by outputting collection request information to the collection unit 5, to collect the data (the third data in FIG. 3) of the apparatus address 91 "192.168.0.1" and information address 92 "10A8" of the collecting information 90 of FIG. 3.

During that time, the collection control unit 8 refers to the collecting information 90 of the storage unit 9 and acquires processing details whose information amount reduction level 95 corresponding to the apparatus address 91 "192.168.0.1" and the information address 92 "10A8" is 1. Thus, the collection control unit 8 acquires "moving average (60 ms)" being processing details whose information amount reduction level 95 is 1. Therefore, the collection control unit 8 outputs collection request information including the processing details "moving average (60 ms)" to the collection unit 5. That is, the collection control unit 8 outputs the collection request information including the apparatus address 91 "192.168.0.1", the information address 92 "10A8", the information size 93 "4", and the processing details "moving average (60 ms)" to the collection unit 5.

With regard to the process of S4, for example, a case where level 2 out of the information amount reduction levels 95 is set will be described.

Assume that the collection control unit 8 controls the collection unit 5, by outputting collection request information to the collection unit 5, to collect data (the fifth data in FIG. 3) of the apparatus address 91 "192.168.0.1" and information address 92 "1F24" of the collecting information 90 of FIG. 3.

During that time, the collection control unit 8 refers to the collecting information 90 of the storage unit 9 and acquires processing details whose information amount reduction level 95 corresponding to the apparatus address 91 "192.168.0.1" and information address 92 "1F24" is 2. Thus, the collection control unit 8 acquires "cumulate" being processing details whose information amount reduction level 95 is 2. Therefore, the collection control unit 8 outputs collection request information including the processing details "cumulate" to the collection unit 5. That is, the collection control unit 8 outputs the collection request information including the apparatus address 91 "192.168.0.1", the information address 92 "1F24", the information size 93 "2", and the processing details "cumulate" to the collection unit 5.

So far the process of S4 with respect to a practical example has been described.

The operation of the collection control unit 8 in S9 will now be described in detail.

Figure 6:
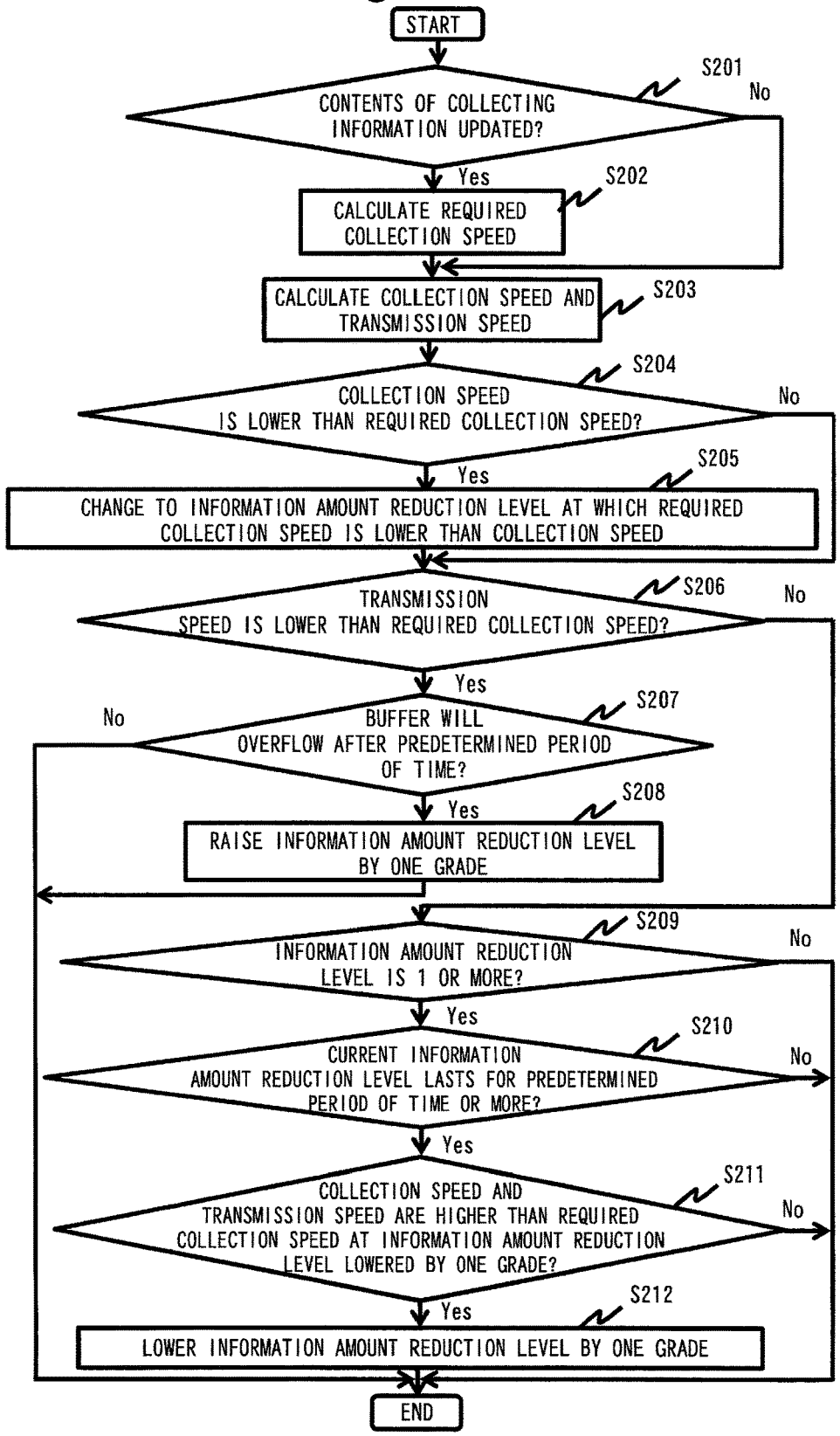
FIG. 6 is a flowchart illustrating in detail an operation of the collection control unit 8 in Embodiment 1 of the present invention.

FIG. 6 is a flowchart illustrating the operation of the collection control unit 8 in Embodiment 1 of the present invention.

The collection control unit 8 checks periodically whether or not the contents of the collecting information 90 are updated (S201). The collecting information 90 is updated when the user inputs, from the external input/output device, addition of the information to be collected.

If the contents of the collecting information 90 are updated, the collection control unit 8 calculates the required collection speed 96 from the information size 93, collection cycle 94, and information amount reduction levels 95 of the updated collection information 90, and updates the information of the required collection speed 96 in the collecting information 90 (S202). Then, the collection control unit 8 executes the processes of S203 and beyond.

How to calculate the required collection speed will be described.

The required collection speed is a collection speed required for collecting all pieces of information to be collected with the cycle set by the collecting information 90. Hence, if for example, level 0 out of the information amount reduction levels 95 is set, the required collection speed 96={(information size 1 corresponding to apparatus address 1 and information address 1/collection cycle 1)+(information size 2 of apparatus address 1 and information address 2/collection cycle 2)+ . . . +(information size P of apparatus address N and information address M/collection cycle P)}. That is, the required collection speed 96 signifies information size as to how much information per second needs to be collected.

If level 1 or higher out of the information amount reduction levels 95 is set, the required collection speed is calculated by applying the processing details to the calculation of reduction level 0 for each piece of information to be collected. For example, in cases of thinning out, the information size that has undergone a thinning-out process is divided by a collection cycle added with thinning-out intervals. In cases of cumulating, cumulative information size is divided by a collection cycle added with a transmission interval of the cumulative information size.

How to calculate the required collection speed has been described above.

As result of checking in S201, if the contents of the collecting information 90 have not been updated, the collection control unit 8 calculates a collection speed and a transmission speed (S203).

The collection speed is calculated from the time since the collection request information is outputted to the collection unit 5 and until the completion message is received, and the information size included in the collection request information. The thus-calculated collection speed will be described hereinafter as the current collection speed.

The transmission speed is calculated from the time since a transmission start time point at which the sending request information is outputted to the transmission unit 7 until a transmission end time point at which the completion message is received, and the information size included in the sending request information. The sending request information includes a buffer address and information size. The thus-calculated transmission speed will be described hereinafter as the current transmission speed.

Basically, when the transmission speed is higher than the collection speed and the collection speed is higher than the required collection speed 96, the collection control unit 8 outputs to the collection unit 5 collection request information including the processing details whose information amount reduction level 95 is 0 (zero).

Then, whether or not the current collection speed is lower than the required collection speed 96 of the current information amount reduction level 95 is checked (S204).

If the current collection speed is lower than the current required collection speed 96, the grade of the information amount reduction level 95 is raised (the level is upgraded) until the required collection speed 96 becomes lower than the collection speed, thereby changing the information amount reduction level 95 (S205).

If the current collection speed is equal to or higher than the current required collection speed 96, the collection control unit 8 processes S206 and beyond.

Then, whether or not the transmission speed is lower than the required collection speed 96 is checked (S206).

If the transmission speed is lower than the required collection speed 96, it is checked whether or not the buffer 6 will lack a capacity for storing information to be collected next (whether or not the buffer 6 will overflow) after a predetermined period of time (S207).

During that time, the collection control unit 8 outputs a storing situation request to the buffer 6 to acquire the storing situation of the buffer 6 from the buffer 6, and checks whether or not the capacity of the buffer is insufficient.

In S206, if the transmission speed is equal to or higher than the required collection speed 96, the processes of S209 and beyond are performed.

In S207, if the capacity of the buffer 6 is insufficient, the information amount reduction level 95 is raised by one grade (S208) to change the information amount reduction level 95. The process is ended (the process of S9 of FIG. 5 is ended) and the process of S1 of FIG. 5 is performed.

In S207, if the capacity of the buffer 6 is not insufficient, the process is ended (the process of S9 of FIG. 5 is ended), and the process of S1 of FIG. 5 is performed.

In S206, if the transmission speed is equal to or higher than the required collection speed 96, whether or not the information amount reduction level 95 is level 1 or higher is checked (S209).

In S209, if the information amount reduction level is 1 or higher, whether or not the current information amount reduction level 95 lasts for a predetermined period of time or more is checked (S210).

In S209, if the information amount reduction level is lower than 1, that is, if the information amount reduction level 95 is level 0, the process is ended (the process of S9 of FIG. 5 is ended) and the process of S1 of FIG. 5 is performed.

In S210, if the current information amount reduction level 95 lasts for the preset predetermined period of time or more, the information amount reduction level 95 is lowered by one grade (the level is downgraded), and it is checked whether or not the required collection speed of the information amount reduction level 95 being lowered by one grade is higher than both of the collection speed and the transmission speed (S211).

In S210, if the current information amount reduction level 95 does not last for the predetermined period of time or more, the process is ended (the process of S9 of FIG. 5 is ended) and the process of S1 of FIG. 5 is performed.

In S211, if both of the collection speed and the transmission speed are higher than the required collection speed of the information amount reduction level being lowered by one grade, the information amount reduction level 95 is lowered by one grade (S212), thereby changing the information amount reduction level 95. Then, the process is ended (the process of S9 of FIG. 5 is ended) and the process of S1 of FIG. 1 is performed.

In S211, if the required collection speed of the information amount reduction level 95 being lowered by one grade is equal to or lower than the collection speed or the transmission speed, the process is ended (the process of S9 of FIG. 5 is ended) and the process of S1 of FIG. 5 is performed.

So far the operation of S9 of the collection control unit 8 has been described in detail.

The operation of the collection unit 5 will now be described.

Figure 7:
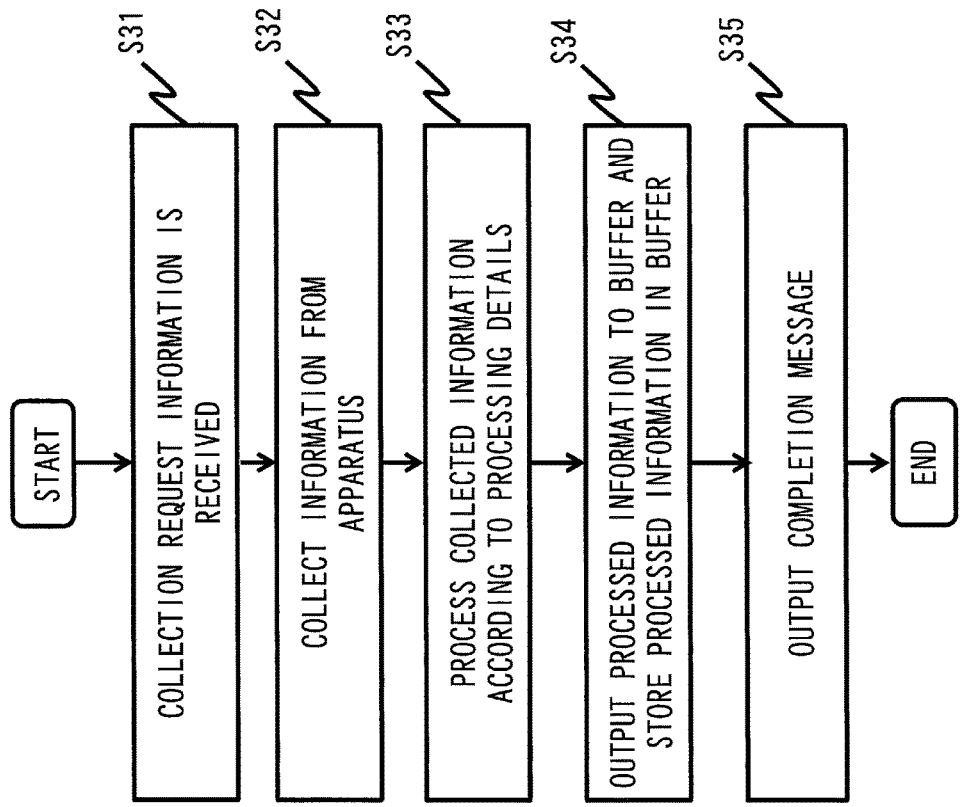
FIG. 7 is a flowchart illustrating an operation of a collection unit 5 in Embodiment 1 of the present invention.

FIG. 7 is a flowchart illustrating the operation of the collection unit 5 in Embodiment 1 of the present invention.

Upon reception of the collection request information from the collection control unit 8 (S31), the collection unit 5 collects information of the information address 92 having the information size 93 from the apparatus of the apparatus address 91 included in the collection request information (S32). The collection unit 5 processes the collected information according to the processing details included in the collection request information (S33). The collection unit 5 outputs to the buffer 6 information whose information amount has been reduced according to the processing details, to temporarily store the information in the buffer 6 (S34). When information collection is completed, the collection unit 5 outputs a completion message to the collection control unit 8 (S35).

If the collection request information does not include processing details, no process is performed. Thus, the information is outputted to the buffer 6 without undergoing information amount reduction.

In this description, the collection request information including the processing details from the collection control unit 8 is received by the collection unit 5. Alternatively, collection request information including an information amount reduction level 95 from the collection control unit 8 may be received by the collection unit 5. In that case, the collection unit 5 refers to the collecting information 90 stored in the storage unit 9 and acquires processing details corresponding to the information amount reduction level 95. The collection unit 5 then processes the collected information according to the processing details and outputs the processed information to the buffer 6.

The operation of the transmission unit 7 will be described.

Figure 8:
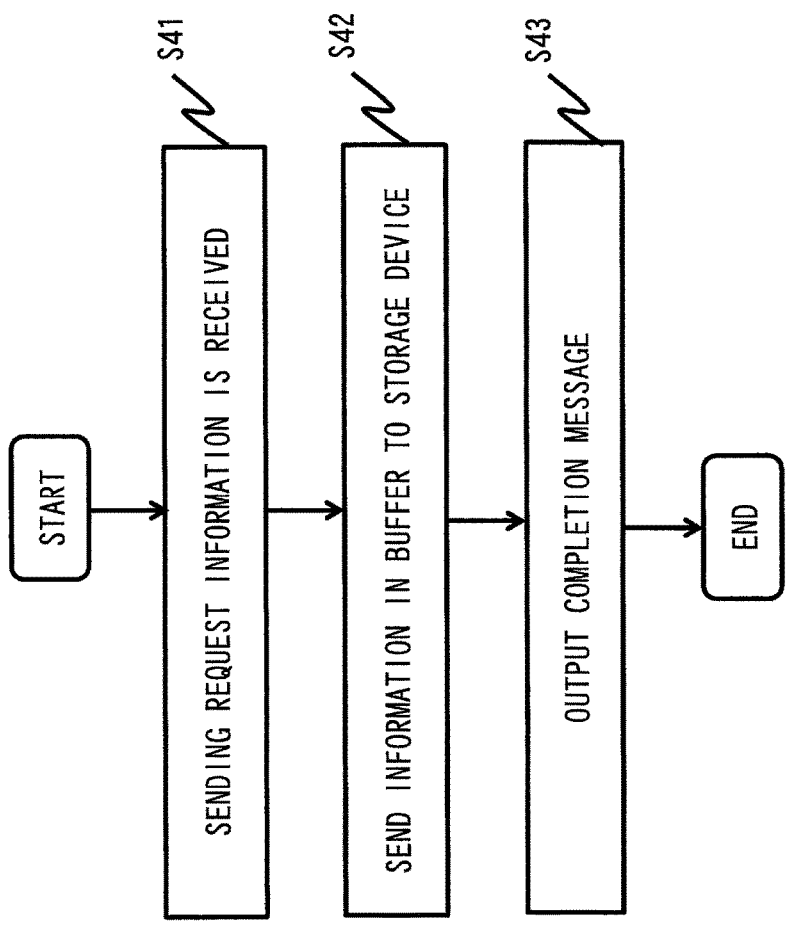
FIG. 8 is a flowchart illustrating an operation of a transmission unit 7 in Embodiment 1 of the present invention.

FIG. 8 is a flowchart illustrating the operation of the transmission unit 7 in Embodiment 1 of the present invention.

Upon reception of the sending request information from the collection control unit 8 (S41), the transmission unit 7 sends the information in the buffer 6 to the storage device 4 according to the sending request information via the communication network 3 (S42), thereby storing the information. When sending is completed, the transmission unit 7 outputs a completion message to the collection control unit 8 (S43).

In this manner, the collection control unit 8 gradually reduces the information amount of the information to be collected, with using the current collection speed, the current transmission speed, and the information amount reduction levels each being gradual setting of the processing details of reducing the information amount for each piece of information to be collected. Hence, if the status of information collection fluctuates sharply and greatly and a situation occurs where the information cannot be collected duly, missing of information to be collected, particularly high-priority information, can be minimized in comparison with cases where the amount of information to be collected is adjusted in accordance with the congestion degree of the network.

In the information amount reduction levels which are set for each piece of information, moving averaging, cumulating, and so on can be set as a processing method of each level. Therefore, missing of information to be collected can be prevented in comparison with cases where the information amount is adjusted by a process of thinning out the information depending on the significance degree of the collected information.

This effect is particularly valid in cases where a plurality of apparatuses are installed and each apparatus switches between working and stopping frequently, or in an managing use of collecting information of factories, houses, buildings, and so on where the information held by the apparatuses changes due to setting modification or the like. For example, in situations where energy information or working information is collected from home appliances used in households for the purpose of energy management of an apartment house, when the number of working apparatuses changes depending on the day or time, the energy management can be continued by setting the processing details for each piece of information necessary for the energy management and gradually reducing the information amount. Besides, this effect is also valid in data collection in a general information system such as log collection in a server or an office personal computer (PC).

Embodiment 2

Embodiment 1 described above illustrates a configuration in which the user closely sets the processing details of reducing the amount of information to be collected, in a plurality of levels for each piece of information sent from the apparatus, and conducts a control operation so as to reduce gradually the amount of information to be collected with using the collection speed, the transmission speed, and the information amount reduction levels each being setting of the processing details which are set gradually. Actually, however, the collecting information 90 of FIG. 3 amounts to an enormous number of pieces and it is not practical to set everything in detail. A configuration will therefore be described in which a processing method of reducing the amount of information to be collected is set more simply for each information amount reduction level of each piece of information.

The details of collecting information 90 employed in this embodiment will be described.

FIG. 9 illustrates examples of the collecting information 90 in Embodiment 2 of the present invention.

An apparatus address 91, information address 92, information size 93, collection cycle 94, and required collection speed 96 are the same as those in Embodiment 1. In Embodiment 2, a processing classification 97 is set additionally for each piece of information to be collected. If an exceptional handling is to be carried out for some information and reduction of the information is not to be started until a certain information amount reduction level is reached, it is possible to set a reduction start level 98 to correspond to the processing classification 97. Then, a process according to the newly set processing classification 97 is defined for each information amount reduction level.

If the processing classification 97 is to be changed depending on the information amount reduction levels 95, it is possible to designate a plurality of processing classifications with reduction start levels 98 to each piece of information. The type of the processing classification 97 shall be determined arbitrarily by the person who collects information.

When the user sets the collecting information 90 including the processing classification 97, he uses, for example, a screen for setting the information amount reduction levels of FIG. 10 and a screen for "adding apparatus information" of FIG. 11.

FIG. 10 is an example of the screen for setting the information amount reduction levels in Embodiment 2 of the present invention.

In the setting of the information amount reduction levels of FIG. 10, the entry items include "levels", "processing classifications", and "processing details". The user enters and sets the processing classifications 97 corresponding to each level and processing details 99 corresponding to the processing classifications of each level. For example, for "level 1", the user enters "averaging", "thinning out", "cumulating" and so on in the processing classifications 97. Furthermore, regarding "level 1", the user enters "moving average" in the processing details 99 for "averaging"; "thin out every fourth piece" in the processing details 99 for "thinning out"; and "no processing" in the processing details 99 for "cumulating". Also, for "level 2", the user enters "averaging", "thinning out", "cumulating", and so on in the processing classifications 97. Furthermore, regarding "level 2", the user enters "moving average" in the processing details 99 for "averaging"; "thin out every second piece" in the processing details 99 for "thinning out"; and "calculate cumulative value" in the processing details 99 for "cumulating". The user sets the information amount reduction levels 95 of the collecting information 90 in this manner.

FIG. 11 is an example of the screen for adding apparatus information in Embodiment 2 of the present invention.

In the additional setting of the apparatus information of FIG. 11, the entry items include "apparatus address", "information address", "information size", "collection cycle", and "information type". For example, the user enters "192.168.0.3" for the "apparatus address"; "0x5B9C" for the "information address; "16 bit" for the "information size"; "25 ms" for "collection cycle"; "averaging" for the "processing classification"; and "1" for the "reduction start level". The user sets the information of the apparatus in the collecting information 90 in this manner.

A collection control unit 8 controls reduction of the amount of information to be collected by the collection unit 5, with using the collecting information 90 which is set in this manner, the current collection speed, and the current transmission speed. The operation of the collection control unit 8 is similar to that of the process illustrated in FIG. 6.

For example, assume that when the collection control unit 8 changes the information amount reduction level to information amount reduction level 1, collection control unit 8 outputs collection request information to collect the third data (the apparatus address 91 "192.168.9.1" and information address 92 "10A8") illustrated in FIG. 9, to the collection unit 5. During that time, since the processing classification 97 corresponding to the apparatus address 91 "192.168.0.1" and the information address "10A8" is "averaging", the collection control unit 8 outputs collection request information including the processing details "moving average" for the processing classification "averaging" set in information amount reduction level 1, to the collection unit 5.

More specifically, the collection control unit 8 controls the collection unit 5 by outputting collection request information including the apparatus address 91 "192.168.0.1", the information address "10A8", the information size 93 "4", the collection cycle 94 "20 ms", and the processing details "moving average" to the collection unit 5. Then, the collection unit 5 processes information of the apparatus address 91 "192.168.0.1" and of the information address "10A8" in accordance with the "moving average", thereby collecting information in a reduced amount.

In this manner, by setting the processing classifications for each piece of information to be collected and setting the processing details corresponding to each processing classification of each information amount reduction level, the user can reduce the amount of information to be collected gradually, with a smaller number of setting operations for the information to be collected. Therefore, if the status of information collection fluctuates sharply and greatly and a situation where the information cannot be collected duly occurs, missing of information to be collected, particularly high-priority information, can be minimized in comparison with cases where the amount of information to be collected is adjusted in accordance with the priority.

INDUSTRIAL APPLICABILITY

As has been described above, with the information processing device and the information processing method according to the present invention, the amount of information to be collected is adjusted by changing gradually the reduction levels of the amount of information to be collected, with using the collection speed, the transmission speed, and the information amount reduction levels each being gradual setting of the processing details of reducing the information amount for each piece of information to be collected. Therefore, for example, when collecting energy information and working information from apparatuses installed in factories, houses, buildings, and so on, if the apparatuses switch between working and stopping frequently and a situation becomes worse so the information cannot be collected duly, missing of information to be collected, particularly high-priority information, can be minimized in comparison with cases where the amount of information to be collected is adjusted in accordance with the priority or by a thinning-out process.

REFERENCE SIGNS LIST

1: information processing device; 2: apparatus; 3: communication network; 4: storage device; 5: collection unit; 6: buffer; 7: transmission unit; 8: collection control unit; 9: storage unit; 10: computation device; 11: main storage device; 12: auxiliary storage device; 13: communication device; 14: bus; 15: input/output device; 90: collecting information; 91: apparatus address; 92: information address; 93: information size; 94: collection cycle; 95: information amount reduction level; 96: required collection speed; 97: processing classification; 98: reduction start level

The invention claimed is:

1. An information processing device comprising:
processing circuitry configured to collect information from an apparatus; and
a buffer to temporarily accumulate the collected information;
the processing circuitry being further configured to,
transmit the information accumulated in the buffer to a storage device;
determine an information reduction level based on current collection speed, current transmission speed, and a collection speed to collect information from the apparatus according to processing methods set for each of the information reduction level such that the higher the information reduction level, the more the amount of information to be collected is reduced, the required collection speed being calculated using a size of the information to be collected, and the processing methods set for each of the information reduction level; and
process the information according to the processing methods set for the determined information reduction level.

2. The information processing device according to claim 1 further comprising a memory to store an address of the apparatus from which the information is to be collected, an address of the information, within the apparatus, an information size, a collection time interval, and processing methods set for each information reduction level, the processing methods corresponding to the information,
wherein the processing circuitry calculates the required collection speed using the information size, the collection time interval, and the processing methods, which correspond to the apparatus address stored in the memory.

3. The information processing device according to claim 1 further comprising a memory to store an address of the apparatus from which the information is to be collected, an address of the information within the apparatus, an information size, a collection time interval, processing each indicating a type of processing methods to reduce the information, and processing methods of each processing category, the processing methods being set for each information reduction level,
wherein the processing circuitry calculates the required collection speed using the information size, the collection time interval, and processing methods of the information reduction level corresponding to the processing category of the information, which correspond to the apparatus address and the information address stored in the memory, and processes the information according to the processing methods being set in the determined information reduction level, the processing methods corresponding to a processing category of the information to be collected.

4. An information processing method of collecting information from an apparatus, the information processing method comprising:
collecting information from an apparatus;
sending from a buffer to temporarily accumulate the collected information, the accumulated information to a storage device; and
determining an information reduction level based on a current collection speed, current transmission speed, and a collection speed required to collect information from the apparatus according to processing methods set for each of the information reduction levels such that the higher the information reduction level, the more the amount of information to be collected is reduced, the required collection speed being calculated using a size of the information to be collected, a collection time interval at which the information is to be collected, and the processing methods set for each of the information reduction levels, and
processing the information according to the processing methods set for the determined information reduction level.

5. An information processing method of collecting information from an apparatus, the information processing method comprising:
collecting information from an apparatus;
transmitting information to a buffer to temporarily accumulate the collection information, the accumulated information to a storage device;
determining information reduction level based on current collection speed, current transmission speed, and a collection speed required to collect information from the apparatus according to processing methods set for each of the information reduction level such that the higher the information reduction level, the more the amount of information to be collected is reduced, the required collection speed being calculated using a size of the information to be collected, a collection time interval at which the information is to be collected, and the processing methods set for each of the information reduction level; and
process the information according to processing methods set for the determined information reduction level.

* * * * *